United States Patent [19]
Tock et al.

[11] Patent Number: 6,128,771
[45] Date of Patent: *Oct. 3, 2000

[54] SYSTEM AND METHOD FOR AUTOMATICALLY MODIFYING DATABASE ACCESS METHODS TO INSERT DATABASE OBJECT HANDLING INSTRUCTIONS

[75] Inventors: Theron D. Tock, Sunnyvale; Roderic G. G. Cattell, Los Altos, both of Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/599,055

[22] Filed: Feb. 9, 1996

[51] Int. Cl.$^7$ ........................................... G06F 9/45
[52] U.S. Cl. ........................................ 717/1; 707/1
[58] Field of Search ................... 395/601, 704, 395/680; 709/300, 301, 303; 717/1, 2, 3; 707/1

[56] References Cited

U.S. PATENT DOCUMENTS

| | | | |
|---|---|---|---|
| 5,325,531 | 6/1994 | McKeenan | 395/704 |
| 5,359,730 | 10/1994 | Marron | 395/704 |
| 5,404,525 | 4/1995 | Endicott et al. | 395/703 |
| 5,493,680 | 2/1996 | Danforth | 395/704 |
| 5,535,392 | 7/1996 | Brett | 395/703 |
| 5,568,642 | 10/1996 | Negoro et al. | 395/703 |
| 5,577,244 | 11/1996 | Killebrew et al. | 395/703 |
| 5,590,269 | 12/1996 | Kruse et al. | 395/601 |
| 5,634,123 | 5/1997 | Bennion | 395/611 |
| 5,835,701 | 11/1998 | Hastings | 395/183.11 |

*Primary Examiner*—Majid Banankhah
*Assistant Examiner*—Peter Stecher
*Attorney, Agent, or Firm*—Pennie & Edmonds LLP

[57] ABSTRACT

A system and method for automatically converting a compiled program that accesses objects stored in main memory into a program that accesses and updates persistently stored objects. An initial computer program includes original instructions for accessing and updating objects in at least a first object class. The original instructions access and update objects in a computer's main memory. The system automatically revises the initial computer program to generate a revised computer program by adding to the original instructions object loading instructions and object storing instructions. During execution of the revised computer program, the object loading instructions load a copy of one of the persistently stored objects into a corresponding object in the computer's main memory when the object is accessed for a first time. The object storing instructions copy objects in the computer's main memory that contain new or modified data into corresponding persistently stored objects upon the occurrence of predefined events, such as the completion of a transaction. The system further revises the initial computer program to generate the revised computer program by adding to the original instructions dirty object marking instructions that, during execution of the revised computer program, keep track of which objects in the computer's main memory contain new and/or updated data. The object storing instructions copy only those of the objects in the computer's main memory that contain new and/or updated data.

21 Claims, 7 Drawing Sheets

182 — Database Object Class

| | |
|---|---|
| Public pointer dirty_object_list_header | 142 |
| Public struct object_hash_table (OID, obj_pointer) | 140 |
| Method: Query | 220 |
| Method: LoadData | 222 |
| Method: MarkDirty | 224 |
| Method: HashFunction | 226 |
| Method: StartTransaction | 228 |
| Method: EndTransaction | 230 |
| Method: AbortTransaction | 232 |
| Method: Initialize hash table and object list | 234 |
| ⋮ | |

FIG. 4

| FIG. 6A |
| FIG. 6B |

…

SYSTEM AND METHOD FOR AUTOMATICALLY MODIFYING DATABASE ACCESS METHODS TO INSERT DATABASE OBJECT HANDLING INSTRUCTIONS

The present invention relates generally to systems and methods for utilizing object-oriented computer programs to process data stored in databases, and particularly to a system and method for automatically modifying an object class method that accesses data in a database so as to insert instructions for retrieving data from the database, and storing new and modified data back into the database at the appropriate times.

BACKGROUND OF THE INVENTION

Object-oriented DBMSs (database management systems) provide persistent storage for programming language objects, and they support storage of virtually any data structure in a programming language. In contrast, traditional record-structured DBMSs require embedded database language (e.g., SQL) statements or procedure calls to copy data back and forth between database and programming language representations, and they only support storage of records. Some new products allow traditional record-oriented databases to automatically be mapped to programming language objects, thus providing the same programmer's view as an object-oriented DBMS. The present invention is an innovative implementation technqiue for these object-relational mappings and also for object-oriented DBMSs. For our purposes, we will use the latter term for both.

An attractive aspect of object-oriented databases is that the computer programs used to manipulate such databases are much easier to understand than traditional database access programs. A much more important advantage of object-oriented databases is that "static data type enforcement" can be applied to the computer programs that access the database. This means that the compiler of such programs can ensure that all data stored in a particular database field matches the data type defined for that field. Thus, a program that tries to put an integer into an employee's name field would be rejected by the compiler in an object-oriented system.

Unfortunately, writing object-oriented programs to access data stored on disk or other secondary memory in a DBMS (database management system) is more difficult than it might appear at first glance. While it is reasonably straightforward to write object class methods that translate accesses to an object field into database queries, writing the code to consistently determine when data needs to be read from the database and when data needs to be written back into the database is somewhat tricky because of the ways in which references to objects (i.e., references in objects to other objects) can be used. For instance, it is important not to inadvertently create two objects in memory that represent the same database object.

For the purposes of this document, the terms "memory" and "main memory" shall be defined to mean the random access memory or primary memory of a computer system, while the terms "secondary memory" and "persistent storage" shall mean disk memory or other form of storage that retains data on a more persistent or longer term basis than main memory.

It is a goal of the present program to enable programmers to write object-oriented database utilization programs as though they were simply dealing with database objects in main memory, without having to concern themselves with the mechanisms for reading and writing data from and to the actual persistent storage database.

More particularly, it is a goal of the present invention to provide a system and method for "post processing" a compiled object-oriented database program so as to automatically insert additional code required to copy data from the database into objects in memory, and to copy new and modified data from objects in memory into the database, at the appropriate times. In this way, programmers can write object-oriented database programs in which objects representing persistently stored data are handled, for purposes of the initial source code program, no differently than objects storing non-persistent data.

SUMMARY OF THE INVENTION

In summary, the present invention is a system and method for automatically converting a compiled program that accesses objects stored in main memory into a program that accesses and updates persistently stored objects. An initial computer program includes original instructions for accessing and updating objects in at least a first object class. The original instructions access and update objects in a computer's main memory. The system and method of the present invention automatically revise the initial computer program to generate a revised computer program by adding to the original instructions object loading instructions and object storing instructions.

During execution of the revised computer program, the object loading instructions load a copy of one of the persistently stored objects into a corresponding object in the computer's main memory when the object is accessed for a first time. The object storing instructions copy objects in the computer's main memory that contain new or modified data into corresponding persistently stored objects upon the occurrence of predefined events, such as the completion of a transaction.

The system and method of the present invention further revise the initial computer program to generate the revised computer program by adding to the original instructions dirty object marking instructions that, during execution of the revised computer program, keep track of which objects in the computer's main memory contain new and/or updated data. The object storing instructions copy only those of the objects in the computer's main memory that contain new and/or updated data.

BRIEF DESCRIPTION OF THE DRAWINGS

Additional objects and features of the invention will be more readily apparent from the following detailed description and appended claims when taken in conjunction with the drawings, in which:

FIG. 4 is a block diagram of a database object class utilized in a preferred embodiment of the present invention.

DESCRIPTION OF THE PREFERRED EMBODIMENTS

Figure 1:
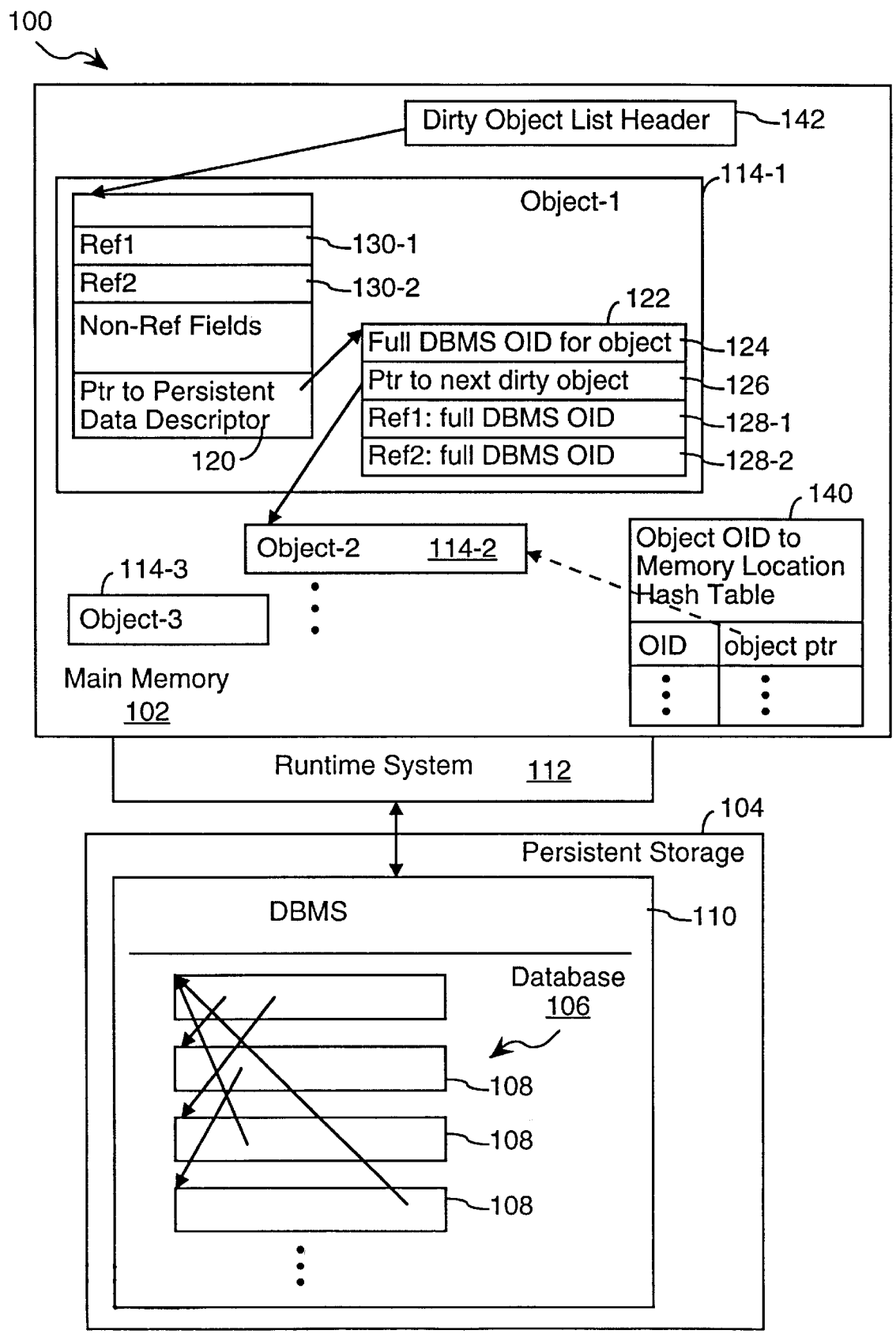
FIG. 1 is a conceptual block diagram of a computer system utilizing a database program that has been revised using the methodology of a preferred embodiment of the present invention.

For the purposes of this document, the terms "database usage program" and "database utilization program" shall mean any program that accesses data stored in a persistently stored database or in a persistently stored file.

In the preferred embodiment, the author of a database usage program writes the program as though the entire database being used is stored in main memory. The source code of the database usage program is therefore free of all the program code required for determining when objects should be copied from the persistently stored database to main memory, for keeping track of which objects in main memory contain new or modified data that will eventually need to be written back to the database if the current transaction is committed, and for writing objects with new or modified data back to the database. As a result, the source code program is much easier to read and revise than a source code program that included all the code required for transferring information back and forth between the database and main memory.

In the preferred embodiment, the source code of the database utilization program is written in the Java programming language, which is a "machine platform independent" programming language marketed by Sun Microsystems, Inc. The source code 200 (see FIGS. 2 and 3) of the database utilization program is compiled into a Java bytecode program 204 using a conventional Java compiler 202, thereby producing a bytecode file that will typically contain a number of object classes.

Java bytecode programs are executed in conjunction with a bytecode program interpreter 176 that forms a virtual machine. Java bytecode programs are designed so that they can be executed on any computer, regardless of the operating system and computer hardware platform of the computer, so long as a Java bytecode program interpreter is present on the computer.

However, the initial, compiled bytecode program version of the database utilization program is not a truly functional program because it was written based on the false assumption that the entire database being used is stored in main memory, whereas the database is actually stored in persistent storage. In accordance with the present invention, the initial, compiled bytecode program version of the database utilization program is revised by a "postprocessor" program 206 that modifies the object classes in the compiled program. The postprocessor 206 modifies the object data structures of the object classes that will be used to store main memory copies of persistent stored objects to enable the storage of additional information required for managing object pointers and for keeping track of "dirty" objects which will need to be stored in the persistently stored database. The postprocessor also modifies the methods of the object classes in the compiled program by adding additional instructions for determining when objects should be copied from the persistently stored database to main memory, for copying objects from the database to main memory, for keeping track of which objects in main memory contain new or modified data that will eventually need to be written back to the database if the current transaction is committed, and for writing objects with new or modified data back to the database.

Referring to FIG. 1, there is shown some of the primary data structures associated with the operation of a database usage program. For the purposes of this explanation, it shall be assumed that a computer system 100 utilizing the present invention includes main memory 102, typically consisting of high speed random access memory, and a persistent data store 104 (also called secondary memory), typically magnetic disk storage or other storage device which retains the information stored therein even when the device is powered off.

The persistent data store 104 stores a database 106, which in this case is assumed to be an object-oriented database that stores numerous objects 108. All or most of the stored objects 108 include pointers to other ones of the objects in the database. In addition, the database 106 is typically part of a database management system (DBMS) 110 that governs all access to the data stored in the database, typically requiring that accesses to the database be performed using well defined commands such as those included in various versions of SQL. For the purposes of this discussion, it will be assumed that the DBMS 110 and database 106 are unchanged by the present invention.

In the preferred embodiment, a runtime system 112 controls the execution of programs, which in turn store data in main memory 102. The programs executed by the runtime system 112 are assumed for the purposes of this application to be object-oriented programs, and therefore tend to store data in main memory in the form of objects 114. Some of the objects, such as object 114-3, stored in main memory 102 are called "transient" objects because they are never stored in persistent storage 104 and thus exist no longer than the process that created them. Other objects, such as objects 114-1 and 114-2 are called "persistent" objects because either (A) a copy of those objects is stored in persistent storage 104, or (B) these objects are configured for storage in persistent storage 104 if the transaction that created them terminates successfully.

It should be understood that the present invention is applicable to any system in which object data is stored in a persistent storage medium upon the satisfaction of a set of object storage criteria (e.g., the occurrence of any of a first set of defined events), and in which object data is retrieved from a persistent storage medium upon the satisfaction of a set of object retrieval criteria (e.g., the occurrence of any of a second set of defined events).

As shown in FIG. 1, in the preferred embodiment persistent objects include a pointer 120 to a persistent data descriptor 122. In the preferred embodiment, the persistent data descriptor 122 includes A) the full object identifier (OID) 124 or address of the object in persistent storage, B) a list pointer 126 that is used if the object is included in a list of "dirty" objects, and C) the full object identifier (OID) 128 or address of each reference 130 in the object to another object. To minimize memory usage, only persistent objects include a persistent data descriptor 122.

For clarity, it should be noted that in the preferred embodiment, when an object is copied from the DBMS 110 (i.e., from persistent storage 104) to main memory 102, all object references in the copied object are 64-bit or larger object addresses that are herein called DBMS object identifiers (OIDs). Those OIDs are stored in the persistent data descriptor 122, and the object reference fields 130 in the main memory object copy 114 are replaced with (A) a null pointer value if the referenced object is not resident in main memory 102, or (B) a main memory object pointer to the copy of the referenced object in main memory if the referenced object is in main memory. In an alternate embodiment the OIDs might consist of unique primary key values associated with the objects copied from the database.

In the preferred embodiment, each object class for persistent objects also supports transient objects. The transient objects have the same data structure as the persistent objects of the same object class, but have a null persistent data descriptor pointer 120. One reason for supporting both transient and persistent objects in the same object class is that it is often convenient to make temporary copies of objects as well as intermediate or transient "working" objects of the same type as persistent objects for use during various calculations, even if the data in the transient objects will never need to be stored in persistent storage 104.

In implementations of the present invention where certain object classes are used only for persistent objects, those object class definitions can be revised to eliminate the persistent data descriptor pointer 120 and to include, instead, the persistent data descriptor 122 itself as part of the main object definition.

Two additional data structures are used in the preferred embodiment to keep track of the objects 114 stored in main memory. First, a hash table 140 is stored in main memory and is used to map DBMS OIDs into main memory object pointers. Whenever an object is copied from the DBMS to main memory, a corresponding entry is added to the hash table that indicates the object's OID as well as its main memory object pointer.

When looking up any object's full DBMS OID in the hash table 140, if a corresponding entry is not found in the hash table 140, then the object has not yet been copied to main memory. On the other hand, if a corresponding entry is found in the hash table, then the object pointer in that entry points to the object in main memory.

Second, a list header 142 points to a linked list of objects that will need to be copied back to persistent storage. These objects are called "dirty" objects because they are like modified data in a cache memory (which are called "dirty" cache lines) that needs to be written back to main memory upon the occurrence of certain events. The linked list is formed by a pointer in the list header 142 plus a sequence of pointers 126 in the persistent data descriptors 122 of the dirty objects. If the dirty object list is empty, the list header 142 contains a null pointer. When the dirty object is not empty, the list header 142 points to the last object to be added to the dirty object list, which in turn points to the next to last object to be added to the dirty object list, and so on.

The last item in the dirty object list, which was the first item to be added to the dirty object list, has a null pointer in its next pointer field 126.

When a "new object" needs to be added to the dirty object list, the sequence of steps to be performed is: (A) copy the object pointer in the list header 142 into the next dirty object pointer field 126 of the new object, and (B) store a pointer to the new object in the list header 142.

Another set of assumptions made in the preferred embodiment is that database objects are used in the context of finite transactions and that each transaction has a well defined beginning, typically defined by a "start transaction" instruction, and a well defined end, typically defined by a "commit transaction" if the results of the transaction are to be durably stored in the database and by a "abort transaction" if the results of the transaction are to be discarded. Furthermore, during the performance of each transaction, it is assumed that the runtime system 112 must request a read lock on all database objects copied to main memory, and must furthermore request a write lock on all database objects whose contents are modified by programs executed by the runtime system 112.

More specifically, the programmer preparing the source code of the database utilization program must include a statement in the source code equivalent to Invoke Database.StartTransaction for invoking the StartTransaction method of the Database object class at the beginning of each transaction. Similarly the programmer must include a statement in the source code equivalent to Invoke Database.EndTransaction for invoking the EndTransaction method of the Database object class at the conclusion of each successfully completed transaction, and must include a statement in the source code equivalent to Invoke Database.AbortTransaction for invoking the AbortTransaction method of the Database object class at the beginning of each unsuccessfully completed transaction.

The StartTransaction, EndTransaction and AbortTransaction methods are described in more detail below with reference to FIG. 4.

Due to the "well defined transaction" context in which the runtime system operates, at the conclusion of each transaction the set of objects stored in main memory will normally be invalidated, preferably by nulling out each object's OID in its PDD. In addition, the contents of the hash table 140 are cleared, and a null pointer is stored in the dirty list header 142, thereby making objects in main memory ready for garbage collection unless the program being executed has created additional pointers to any of these objects. However, a properly written program should not retain pointers to any objects in main memory after a transaction is completed, because all such objects should be considered to be invalid and unusable.

It is noted that, usually, all or most transient objects stored in main memory will be referenced, directly or indirectly, by persistent objects stored in main memory. By invalidating all persistent objects in main memory and making all such persistent objects unreachable, transient objects in main memory will also normally become unreachable and thus ready for garbage collection.

In alternate embodiments, such as in systems that do not use garbage collection to delete unusable objects, the objects in main memory could be explicitly deleted and deallocated.

Computer System Configuration

Figure 2:
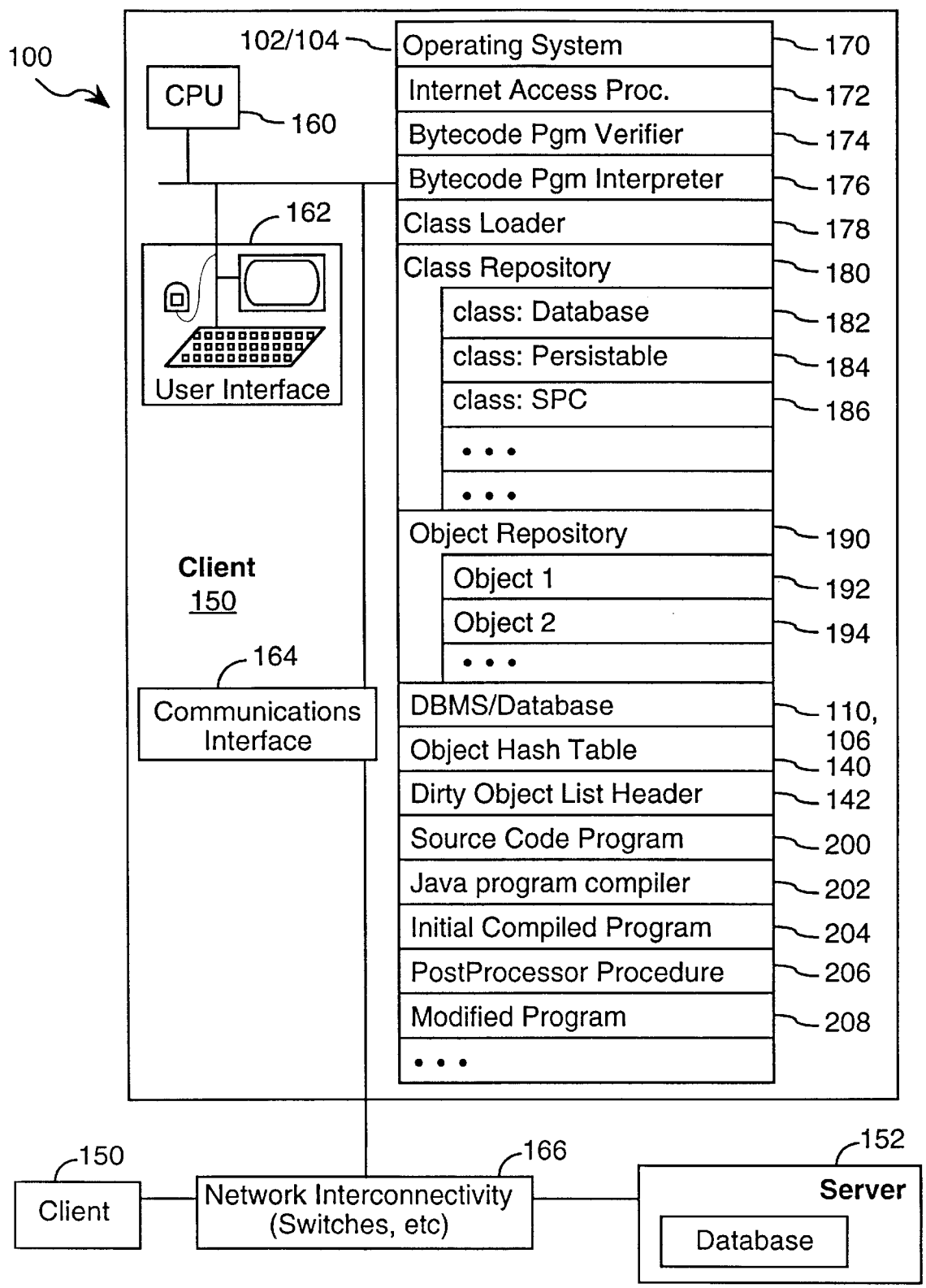
FIG. 2 is a conceptual block diagram of a preferred embodiment of the methodology of the present invention

Referring to FIG. 2, in a preferred embodiment the computer system 100 incorporating a preferred embodiment of the present invention will typically be either a stand alone computer, or a client computer 150 or server computer 152 in a system of networked computers. For the purposes of the present discussion, we will assume the preferred embodiment of the invention is embodied on a client computer 150. The client computer 150 includes a central processing unit (CPU) 160, a user interface 162, and a communications interface 164 for communication with other computers via communications network 166.

Memory 102/104, which includes both main memory 102 and persistent storage 104, stores:

an operating system 170;

an Internet communications manager program 172;

a Java bytecode program verifier 174 for verifying whether or not a specified program satisfies certain predefined integrity criteria;

a Java bytecode program interpreter 176 for executing application programs;

a class loader 178, which loads object classes into a user's address space and utilizes the bytecode program verifier to verify the integrity of the methods associated with each loaded object class;

at least one class repository 180, for locally storing object classes 182, 184, 186 in use and/or available for use by user's of the computer 102;

at least one object repository 190 for storing objects 192, 194, which are instances of objects of the object classes stored in the object repository 182;

an object hash table 140, for keeping track of objects stored in main memory that correspond to objects stored in a DBMS database 110/106;

and a dirty object list header 142.

Also stored in memory 102/104, are:

a source code database utilization program 200;

a Java program compiler 202;

an initial compiled program 204 generated by the compiler 202 from the source code program 200;

the postprocessor procedure 206 of the preferred embodiment; and a modified program 208 generated by the postprocessor procedure 206.

However, it should be understood that the source code 200, compiler 202, initial compiled program 204, and postprocessor procedure 206 are normally not stored in main memory 102 during execution of the modified program 208.

In the preferred embodiment the operating system 170 is an object-oriented multitasking operating system that supports multiple threads of execution within each defined address space. The operating system furthermore uses a garbage collection procedure to recover the memory space associated with released data structures. The garbage collection procedure is automatically executed on a periodic basis, and is also automatically invoked at additional times when the amount of memory available for allocation falls below a threshold level.

Figure 3:
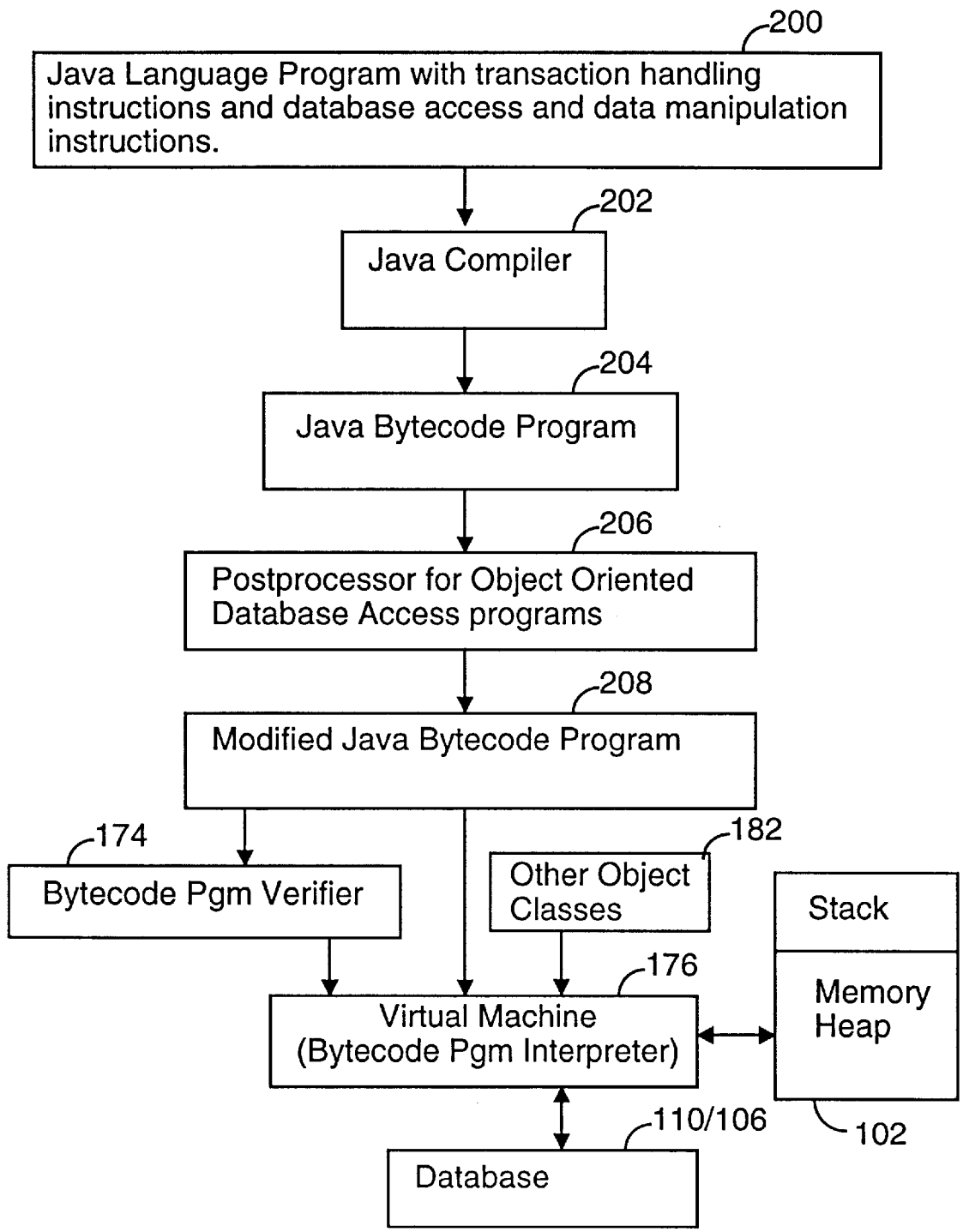
FIG. 3 is a block diagram of a computer system incorporating a preferred embodiment of the present invention.

Referring to FIG. 3, the system and method of the preferred embodiment receives an initial, source code, Java language database utilization program 200. This initial source code program is compiled by a conventional Java compiler 202 to produce a Java bytecode program 204. The Java bytecode program, however, is not a truly functional program because its code is based on the false assumption that the entire database being used is stored in main memory, whereas the database used by the program is actually stored in persistent storage.

The initial, compiled bytecode program version of the database utilization program 204 is next revised by a "postprocessor" 206 that modifies the object classes in the compiled program and thereby generates a modified Java bytecode program 208. The postprocessor 206 modifies the object data structures of the object classes that will be used to store main memory copies of persistently stored objects to enable the storage of additional information required for managing object pointers and for keeping track of "dirty" objects that will need to be stored in the persistently stored database. The postprocessor 206 also modifies the methods of the object classes in the compiled program by adding additional instructions for determining when objects should be copied from the persistently stored database to main memory, for copying objects from the database to main memory, for keeping track of which objects in main memory contain new or modified data that will eventually need to be written back to the database if the current transaction is committed, and for writing objects with new or modified data back to the database.

The modified program 208 includes method calls to methods of one or more predefined object classes 182, which will be described in more detail below. Generally, however, the methods in the predefined object class(es) used by the modified programs are the methods needed to work with the persistent data descriptor structure 122 (see FIG. 1) used with persistent objects, and for handling the movement of data to and from the database 106.

The integrity of the resulting modified bytecode program 208 is verified by the bytecode program verifier 174 and then executed by the bytecode program interpreter 176.

Referring to FIG. 4, in the preferred embodiment there is a predefined object class, called the Database object class, that contains all the methods required for working with persistent objects and for handling the movement of data to and from the database 106. The Database object class includes two variables: 1) the dirty object list header 142 and 2) the object hash table 140.

The methods included in the Database object class are:

a Query method 220, for requesting one or more database objects that meet user or program specified criteria, and for creating copies of those objects in main memory;

a LoadData method 222, which loads data from a specified database object into an object in main memory, and which also causes the creation of a persistent data descriptor for that object in main memory; the LoadData method also requests and obtains a read lock on the corresponding DBMS object, and adds an entry to the hash table for each object loaded into main memory;

a MarkObject as dirty method 224, which adds a specified object in main memory to the dirty object list; the MarkObject method also requests and obtains a write lock on the corresponding DBMS object;

a hash function method 226, which is used by the database query method 220 and the load data method 222 to look up an object ID in the hash table 140 as well as to determine where to store new entries in the hash table 140;

a StartTransaction method 228, which is used to initialize the object hash table 140 and dirty object list header 142 at the beginning of a transaction, but only if they are not already initialized at the start of the transaction;

an EndTransaction method 230, which is called when a transaction ends successfully (i.e., commits), and is used first to copy all objects in the dirty object list to the database 106 and then to re-initialize the object hash table 140 and dirty object list header 142;

an AbortTransaction method 232, which is called when a transaction ends unsuccessfully (i.e., aborts), and is used to re-initialize the object hash table 140 and dirty object list header 142; and a method 234 for initializing the hash table and dirty object list, which is called by the start, end and abort transaction methods 228, 230 and 232, to initialize or re-initialize the object hash table 140 and dirty object list header 142, and to thereby make all persistent objects previously stored in main memory unusable.

The Query, StartTransaction, EndTransaction and AbortTransaction methods of the are used by programmers when writing database programs. The LoadData, MarkDirty and HashFunction methods of the Database object class are used only by instructions in modified programs generated by the postprocessor 206.

When the Query method 220 is called and results in the return of one or more objects from the database, a read lock is automatically requested on all the requested objects. Furthermore, all objects returned by the database Query method 220 are represented in main memory as persistent objects, each having a persistent data descriptor 122.

The StartTransaction method 228 (A) clears the hash table 140 and dirty list pointer 142, if they are not already cleared, and (B) sends a "start transaction" command to the DBMS so as to properly initialize the internal state of the DBMS.

The EndTransaction method 230 method works as follows. At the end of a successful transaction, all the objects in the dirty object list need to be copied to persistent storage. However, before the dirty objects are copied to the DBMS, all transient objects referenced by object pointers in dirty objects being copied to the DBMS must be converted into persistent objects and added to the list of dirty objects that are to be copied to the DBMS. This is necessary to avoid having unresolved pointers in DBMS objects. In the preferred embodiment, the EndTransaction method for copying all objects in the dirty object list to persistent storage performs two passes through the dirty object list. A first pass is used to (A) locate all transient object referenced by objcts in the dirty object list, directly or indirectly through other transient objects, (B) to obtain database OIDs for all those objects, (C) convert all those referenced transient objects into persistent objects, and (D) to add references to these objects to the hash table and dirty object list.

Then, in the second pass each object in the dirty object list is copied to the DBMS, replacing the local object references in each object with their corresponding DBMS OIDs before sending the object to the DBMS. Then a "commit transaction" command is sent to the DBMS, which causes all read locks previously obtained on DBMS objects to be released and all DBMS object changes to be durably stored.

Table 1 is a pseudocode representation of the Database.EndTransaction method.

TABLE 1

Pseudocode Representation of Database. EndTransaction Method

/* First Pass */
For each object in the dirty object list
  {
    For each transient object referenced by the dirty object
    {
      Request the DBMS to assign a unique OID to this transient object
      Store the transient object's assigned OID in the PDD of the referring dirty object
      Create a PDD for the transient object to convert it into a persistent object
      Fill in the object's PDD
      Add this object to the dirty object list at a position below the position of the dirty object currently being processed
    }
    For each non-null object pointer in the dirty object that does not have a corresponding OID in the dirty object's PDD
    {
      Get referenced object's OID from its PDD
      Store the reference object's OID in the PDD of the referring dirty object
    }
  }
/* Second Pass */
Store all objects in the dirty object list to the DBMS, replacing local object
  references in each object with their corresponding DBMS OIDs
  before sending the object to the DBMS
Send a "committ transaction" command to the DBMS, which causes all
  read locks previously obtained on DBMS objects to be released and
  all DBMS object changes to be durably stored.

The AbortTransaction method 232 (A) clears the hash table 140 and dirty list pointer 142, and (B) sends an "abort transaction" command to the DBMS so as to reset the internal state of the DBMS.

Postprocessor Procedure

Figure 5:
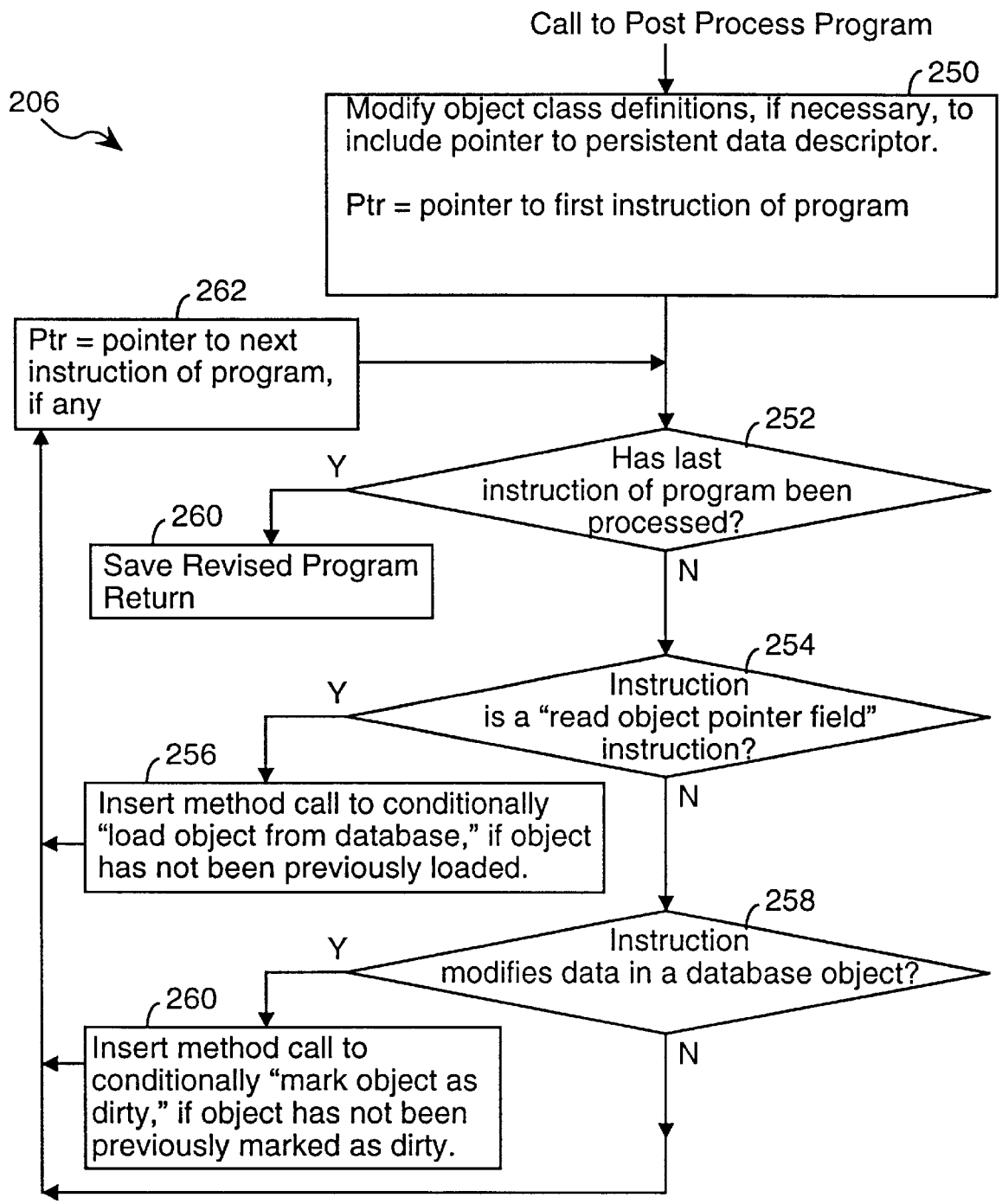
FIG. 5 is a flow chart of the methodology utilized in a preferred embodiment of the present invention.

Referring to FIGS. 4 and 5, the data structures and methods of the Database object class are used by the code inserted by the postprocessor into a compiled database usage program. The process of postprocessing a compiled database usage program in the preferred embodiment is as follows.

The postprocessing procedure begins (step 250) by modifying the object class definitions in the compiled database usage program, and by setting a pointer to the first instruction of the program.

All object classes of the compiled database usage program that may be used to store data copied from a database or other persistent storage are modified to include a pointer to a persistent data descriptor. In some embodiments of the invention, the postprocessor will receive a list of all object classes whose objects may be used to store persistent data, in which case only those object classes are inspected and modified to include a persistent data descriptor. In other embodiments it is assumed that all object classes in the initial compiled database usage program are potentially used to store persistent data, and thus all object classes are inspected and modified to include a persistent data descriptor pointer.

Next, each statement or instruction of the initial compiled database usage program is inspected (steps 254, 258) to determine if the statement is one of several instruction types that require special processing. In the following description, the instructions added to the compiled database usage program will be written in pseudocode form. The pseudocode used in this document utilizes universal computer language conventions. While the pseudocode employed here has been invented solely for the purposes of this description, it is designed to be easily understandable by any computer programmer skilled in the art.

Code Inserted For "GetField" Instructions That Reference an Object Pointer Field of an Object If the current instruction (i.e., the one pointed to by the postprocessor pointer) is an instruction for reading an object pointer field from an object (called a "getfield" instruction in the Java bytecode language) (step 254), then the instructions shown in Table 2 are added to the program (step 256). For ease of reference, the added instructions in Table 2 are numbered.

TABLE 2

Code added after a "read object pointer field" instruction

/* Compiled code, after postprocessing, looks like this: */
Push ptr  /*  push pointer to referring object onto stack */
Getfield F  /*  get object pointer to referenced object where
              information is stored. The Getfield F instruction
              leaves a pointer to the referenced object on top of
              the stack */
<code is inserted here into the program by the postprocessor to do
  special processing if the object pointer retrieved by the above
  instruction is null>
/* The next instruction in the compiled program can be virtually any
  instruction, such as: */
Getfield G /* get information from field G of the referenced object */
/* The code inserted into program is as follows, after the Getfield F
  instruction above, is: */
01    If the object pointer at the top of the stack (i.e., the one obtained by
      the "Getfield F" instruction) is not null
02    {Goto S1}
03    If the referring object does not have a persistent data descriptor
      {

TABLE 2-continued

Code added after a "read object pointer field" instruction

| | |
|---|---|
| 04 | Throw a null pointer exception (which may cause the program to abort execution)<br>} |
| 05 | Get the database object identifier (OID) for the object from the persistent data descriptor of the referring object |
| 06 | If OID is null<br>{<br>/* OID is null when the database object contains a null pointer, such as at the leaf node of a list or tree. */ |
| 07 | goto S1<br>} |
| 08 | ptr = hash table(OID) |
| 09 | If ptr is not null (i.e., the hash table has an entry for the OID)<br>{ |
| 10 | copy ptr into the appropriate field of the referring object<br>} |
| 11 | Else<br>{ |
| 12 | ptr = Database.LoadData (OID)<br>/* the Database.LoadData method performs the following steps: |
| 12a | fetch object for OID from database |
| 12b | create and initialize a new object instance of the corresponding object class |
| 12c | create a persistent data descriptor for the new object |
| 12d | copy contents of fetched object into the new object, except that OIDs from the fetched object are copied into the new object's persistent data descriptor |
| 12e | create new record in hash table for the new object |
| 12f | ptr = pointer to new object<br>*/<br>} |
| 13 | push ptr onto stack |
| 14 | S1:<br>/* the next instruction of the compiled program follows the S1 label */ |

An explanation of the added instructions is as follows. In this explanation, the "referring object" is an object that contains a pointer to another object that is herein called the "referenced object." Further, it should be understood that the inserted "instructions" in the Tables 1 and 2 are pseudocode instructions, and that the number and format of actual instructions added will vary depending on the programming language used.

Added instruction 01 simply tests for whether or not the object pointer for the referenced object is null. If the object point is not null, then a jump (instruction 02) to label S1 is performed, and execution of the original program code resumes. Thus, when a referenced object already exists in main memory, only one added instruction is executed: a conditional branch that is conditioned on a non-null pointer test.

If the object pointer for the referenced object is null (instruction 01), then the remaining instructions (03 to 14) are used. Instruction 03 checks to see if the referring object has a persistent data descriptor. If not, this may be a fatal error because the program is attempting to access an object that may not exist, and instruction 04 throws a null pointer exception, which causes an exception handler to take over control of the program.

Assuming that the referring object does have a persistent data descriptor, instruction 04 will not be executed, and instead instruction 05 will be executed, which obtains the object identifier (OID) for the referenced object from the referring object's persistent data descriptor.

Instruction 06 determines if the OID is null. If so, that indicates the program is most likely performing a tree or list traversal and has reached a leaf node. At this point, instruction 07 simply transfers control back to the next instruction of the original program by performing a branch to the S1 label, leaving a null pointer on the stack.

Next, assuming that a non-null OID has been found, instruction 08 accesses the hash table to request the object pointer, if any, corresponding to the OID. Instruction 09 checks to if the hash table returns a non-null object pointer. If so, this means the referenced object is already in main memory. In that case instruction 10 copies the object pointer into the appropriate field of the referring object, instruction 18 pushes the object pointer onto the stack, and then control is returned to the original program instructions at label S1.

Instruction 12 is are executed only if instruction 09 determines that the referenced object is not in main memory. Instruction 12 invokes the Database.LoadObject method, which a) fetches the referenced object from the database, b) creates and initializes a new instance of the appropriate object class, c) creates a persistent data descriptor for the new object, d) copies the contents of the fetched object into the new object, and storing any OIDs (i.e., references to other objects in the database) from the fetched object into the new object's persistent data descriptor, and e) creates a new record in the hash table for the new object. Instruction 14 pushes the object pointer for the new object onto the stack. Then control is returned to the original program instructions.

In summary, the added code determines if the referenced object is already in main memory, and if not, it fetches the object from the database and stores the information from the fetched object in a new object in main memory. This code is added to the original compiled program only at program locations where it is possible the program could attempt to read information (A) using a null object pointer to an object that is already in main memory, or (B) using a null object pointer to an object that has not yet been copied into main memory.

Code Inserted For "Put Field" Instructions

If the current instruction (i.e., the one pointed to by the postprocessor pointer) is an instruction for storing information into an object (called a "putfield" instruction in the Java bytecode language) (step 258), then the instructions shown in Table 3 are added to the program (step 260). For ease of reference, the added instructions in Table 3 are numbered.

TABLE 3

Code Added to "Store Information in Object" Instruction

| | |
|---|---|
| | /* Source Code is assumed to be: "E.G = V", where E is an object pointer, G indicates a field of E, and V is the value being stored */<br>/* Compiled code, after postprocessing, looks like this: */<br>Push E /* push pointer to an object onto the stack */<br>/* or this could be any other instruction that leaves an object pointer on the stack /*<br><See below for code that is inserted into the program by the postprocessor just before the "Push V" instruction to mark the object as dirty, if it has not already been marked dirty, and to perform specially handling of instructions that update object pointer fields> |
| Push V | /* V is number, pointer, or other value to be stored in the object */ |
| Putfield G | /* store information into field G of the object */ |
| | /* The code inserted into program before the Push V instruction is as follows: */ |
| 31 | Push onto the stack another copy of the object pointer at the top of the stack |
| 32 | PDD1 = pointer to object's persistent data descriptor |
| 33 | If PDD1 is null<br>{<br>/* Object is an ordinary transient object, so it can't be marked as dirty */ |

TABLE 3-continued

Code Added to "Store Information in Object" Instruction

34 Goto S2
   }
35 LL = PDD1.LinkList /* LL is value of linked list pointer
   in the PDDptr persistent data descriptor */
36 If LL is not null
   {
   /* Object is afready marked as dirty */
37 Goto S2
   }
   /* Mark object as dirty and request write lock*/
38 Invoke Database.MarkDirty /* call to Database method */
   /* The MarkDirty method also requests a WriteLock from the
   database */
40 S2:
   /* The following code is inserted only if the field being written to is
   an object pointer field, in which case the value being pushed onto
   the stack V is an object pointer */
41 push V onto stack
42 If V is non-null
   {
43 PDD2 = V.PDD /* pointer to object's persistent data descriptor */
44 If PDD2 is null
   {
   /* The V object is an ordinary transient object, so it doesn't
   have an OID to be inserted in the referring object */
45 Goto S3
   }
46 OID1 = OID for V object
47 Store OID1 in the appropriate field of the referring object's
   persistent data descriptor (i.e., the one pointed to by PDD1)
   }
48 S3:
   /* the Push V instruction in the original compiled program follows
   the S3 label, or follows the S2 label if the code between the S2
   and S3 labels is not inserted An explanation of the added instructions in Table 2 is as follows.

Instructions 31 and 32 get a copy of the persistent data descriptor pointer from the an object, sometimes called the referring object. Instruction 33 tests to see if the pointer is null. If the pointer is null, that means the referring object is a transient object, which cannot be marked dirty, in which case instruction 34 of the inserted code performs a branch to label S2.

Next, instruction 35 gets the linked list pointer in the referring object's persistent data descriptor, and instruction 36 tests to see if it is not null. A non-null linked list pointer indicates the object has previously been marked as dirty, in which case instruction 37 of the inserted code performs a branch to label S2.

If the referring object has a persistent data descriptor and has not previously been marked as dirty, instruction 38 invokes the MarkDirty method of the database object class to mark the object as dirty. The MarkDirty method includes instructions for requesting a write lock from the database.

Instructions 41 to 48 are added to the original compiled program only if the field to which a value is being written is an object pointer field. Instructions 41 and 42 determine if the value V to be stored in the referring object is a null object pointer. If the value V to be stored is a null object pointer, control is passed to the instruction following label S3 (i.e., the "Push V" instruction in the original compiled program) because there is no OID to be stored in the referring object's persistent data descriptor.

If the value V to be stored is not a null object pointer, instructions 43 and 44 determine whether the object pointed to by value V has a persistent data descriptor. If not, there is no OID to be stored in the referring object's (i.e., object E's) PDD, and control is passed to the instruction following label S3. Otherwise, the OID corresponding to the value V is obtained by instruction 46 and stored in the appropriate field of the referenced object's persistent data descriptor by instruction 47.

Steps 262 and 252 of the procedure shown in FIG. 5 are executed after each instruction of the original compiled program is processed, advancing the pointer to the next program instruction, if any, and determining when the postprocessing procedure has been completed.

It should be noted that the modified program produced by the postprocessor is, in the preferred embodiment, a valid Java bytecode program. Thus, when appropriate, the modified program produced by the postprocessor can be further compiled into native code for the computer platform on which it is to be executed.

Alternate Embodiments

In an alternate embodiment, the insertion of the code shown in Table 1 after each getfield instruction for reading an object pointer field in an object can be avoided in most instances by the use of a clever "null object pointer" exception handler. A null object pointer exception occurs whenever the runtime system attempts to execute an instruction, such as a getfield or putfield instruction, that requires a valid object pointer to be stored on the operand stack, but the value on the stack is that of a null object pointer.

In this alternate embodiment, at step 250 of the postprocessor procedure of FIG. 5, the postprocessor adds a null pointer exception handler to the compiled database utilization program being processed and also modifies the program's exception handler table so as to reference the inserted null pointer exception handler. Step 256 is modified so that the instructions shown in Table 1 are inserted in the program (by step 268) only if the null pointer exception handler is likely to have trouble identifying the referring object from which a null object pointer field was obtained. That is, if the first instruction to use an object pointer is far removed in the program from the instructions that retrieve the object pointer from a first object, then the exception handler may be unable to identify that first object. For instance, consider a program has the following sequence of instructions:

P1=Object Pointer read from field F2 of Object O1
  <many intervening instructions, possibly including branch instructions and other instructiosn that read various object fields>
push P1 onto stack
getfield F3

In the above example, if the "getfield F3" instruction causes a null pointer exception, the exception handler may be unable to determine that the null object pointer on the stack was obtained from object O1. In such circumstances, the postprocessor still inserts the code shown in Table 1 after the instructions for reading the object pointer field of object O1.

In this alternate embodiment, in most cases no overhead is incurred during runtime when a non-null object pointer is read from an object, while in the first preferred embodiment at least one additional instruction (a non-null test instruction that causes a program branch) must be executed for every such getfield instruction.

As indicated above, the null pointer exception handler is called whenever the modified database usage program, during execution of the program, attempts to reference an object using a null pointer. The modified database usage program should attempt to reference an object with a null pointer only (A) when it is first attempting to perform a "getfield" or "putfield" operation for accessing information in an object that has not yet been brought into main memory from the database, or (B) it is using an object pointer from an object not previously used to reference an object in main memory. The null pointer exception handler is described below with reference to FIG. 6.

Figures 6, 6A:
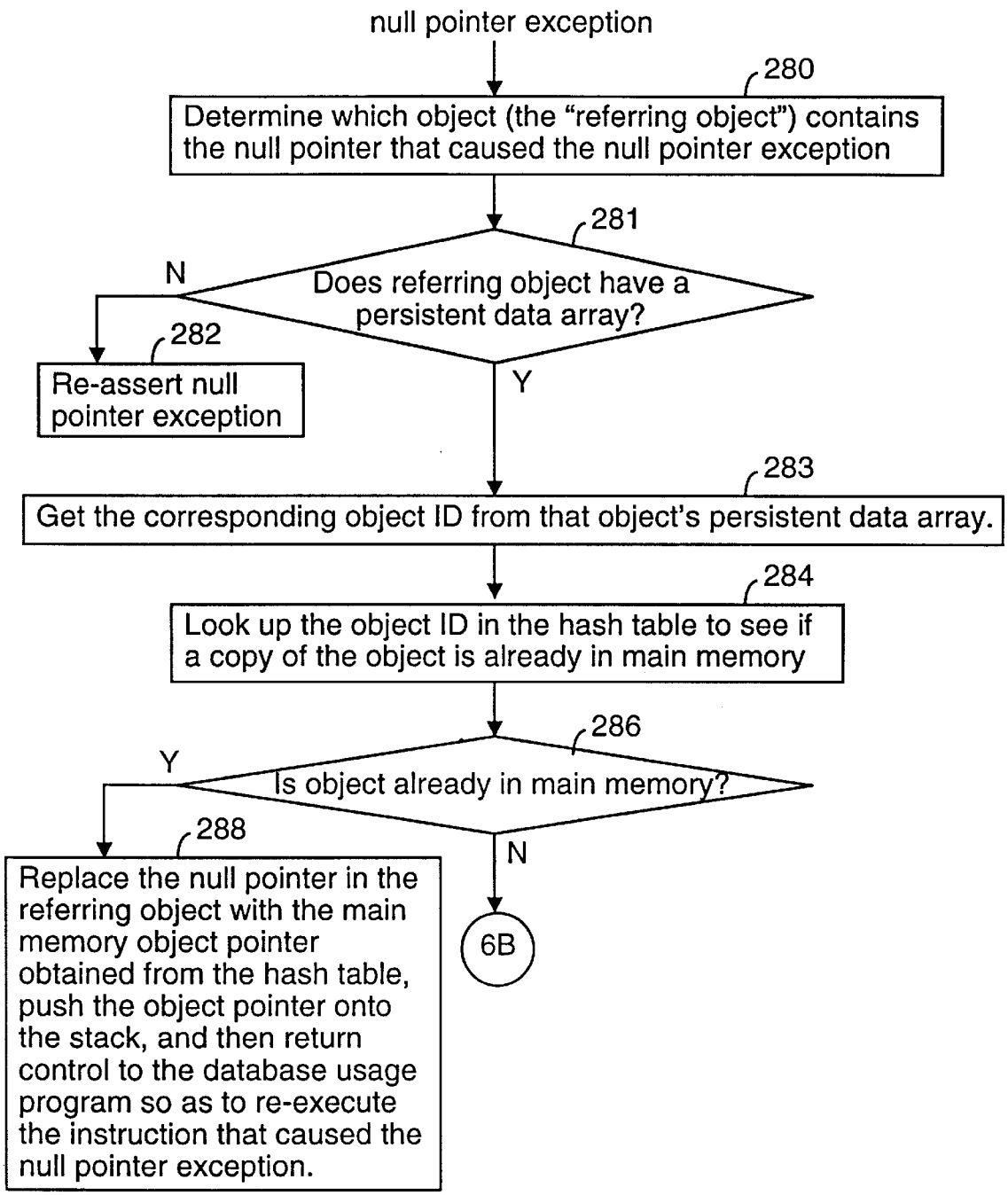
FIG. 6 is a flow chart of a null pointer exception handler procedure used in an alternate embodiment of the present invention.
Figure 6B:
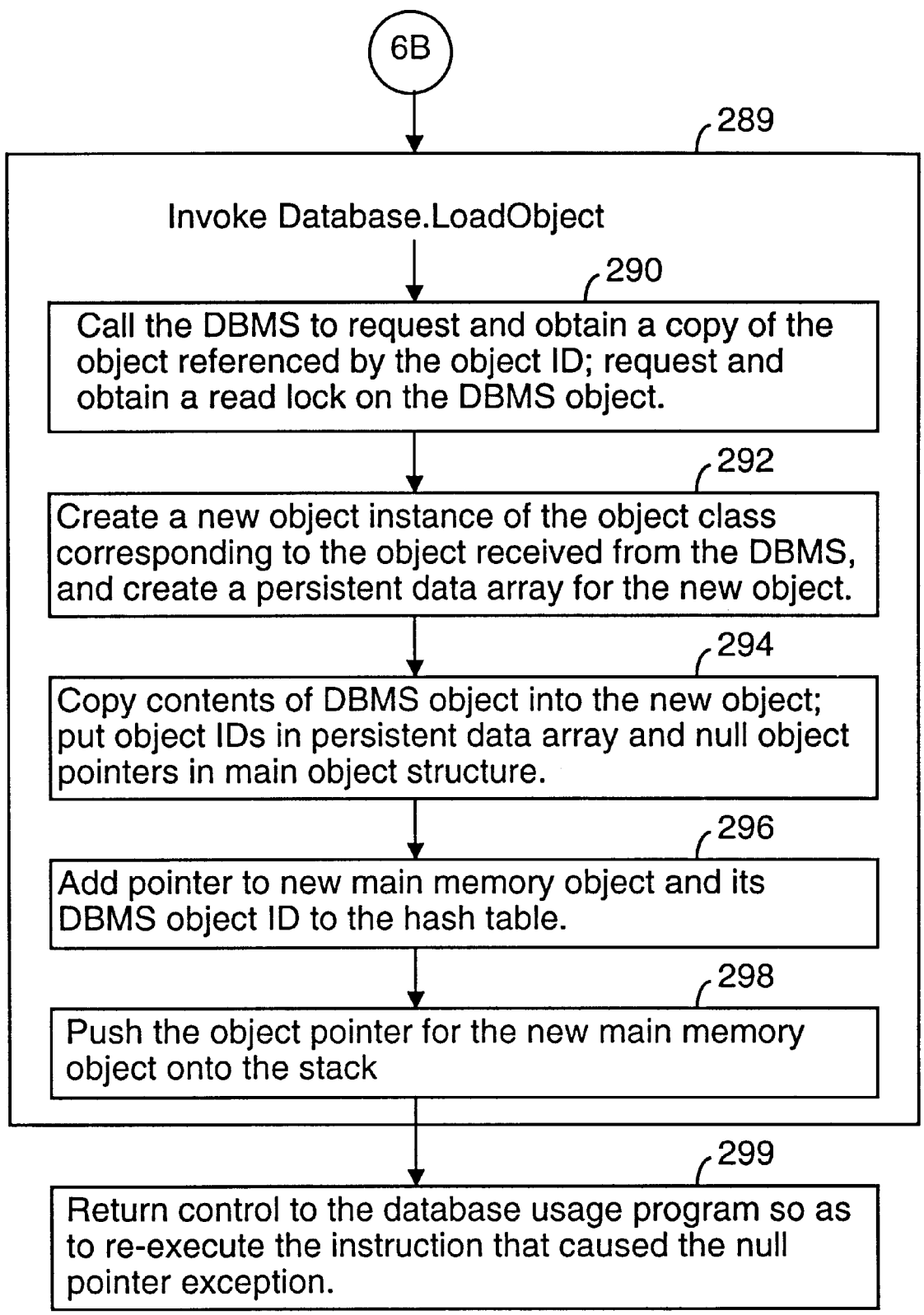

Referring to FIG. 6, the null pointer exception handler performs the following steps:

A) determine which object (the referring object) contains the null object pointer that caused the null pointer exception (280);

B) if the referring object does not have a persistent data descriptor (281), re-assert the null pointer exception (282), so as to cause a next higher level exception handler, if any, to be invoked;

C) if the referring object does have a persistent data descriptor (281), get the corresponding database object ID from that object's persistent data descriptor (283);

D) look up the object ID in the hash table to see if a copy of the object is already in main memory (284);

E) if the object is already in main memory (286, Y), replace the null pointer with a copy of the main memory object pointer to the object (copied from the hash table), push the object pointer onto the program operand stack, and then return control to the database usage program so as to cause it to re-execute the instruction that caused the null pointer exception (288);

F) if the object is not already in main memory (286, N), invoke the Database.LoadObject method (289), and G) then return control to the database usage program so as to cause it to re-execute the instruction that caused the null pointer exception (299).

The Database.LoadObject method, when invoked, performs the following steps:

H) request and obtain a copy of the object referenced by the object ID; also request and obtain a read lock on the DBMS object (290);

I) create a new object instance of the object class corresponding to the object received from the DBMS, and create a persistent data descriptor for the object (292);

J) copy the contents of the DBMS object into the new object, except that all object identifiers in the new object are stored in the persistent data descriptor for the new object and the object identifiers in the main object are replace with null object pointers (294);

K) add to the hash table a record containing a pointer to the new object and its database object identifier (296); and L) push a copy of the main memory object pointer onto the program operand stack pointer (298).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of generating object-oriented computer programs for accessing and updating persistently stored objects, wherein the method is performed under program control by a computer, the method comprising the steps of:

receiving an initial computer program that includes original instructions for accessing objects stored in a computer's main memory;

scanning the initial computer program to automatically identify object accessing instructions and corresponding program locations at which additional instructions are to be added representing a first subset of identified program locations;

automatically, under computer program control, revising said initial computer program to generate a revised computer program by:

adding object loading instructions to the initial computer program at the first subset of the identified program locations, wherein the added object loading instructions, during execution of said revised computer program, load respective ones of said objects from persistent storage into said main memory when each said respective object is accessed for a first time;

wherein said received initial computer program also includes original instructions for updating objects stored in the computer's main memory;

the method further including:

scanning said initial computer program to automatically identify object updating instructions and corresponding program locations at which additional instructions are to be added representing a second subset of program locations;

said revising step further including, automatically, under computer program control, revising said initial computer program by:

adding object storing instructions to said initial computer program at the second subset of the identified program locations, wherein the added object storing instructions, during execution of said revised computer program, store respective ones of said objects in said computer's main memory into said persistent storage upon the occurrence of predefined events;

wherein said objects accessed and updated by said original instructions include objects in a first set of object classes, and said objects stored in said persistent storage by said object storing instructions include objects in a second set of object classes that is a subset of said first set of object classes;

said original instructions include object data structure defining instructions for defining data structures associated with said objects in said first set of object classes;

said revising step further includes:

adding supplemental object definition instructions that revise said data structures associated with said second set of object classes so as to enable said objects in said second set of object classes to store both main memory object pointers and persistent storage object identifiers for objects referenced by said objects in said second set of object classes.

2. The method of claim 1, said revising step further including:

adding dirty object marking instructions to the initial computer program that, during execution of said revised computer program, store data indicating which objects in said computer's main memory contain new and/or updated data;

wherein said object storing instructions store in said persistent storage those of said objects in said computer's main memory that contain new and/or updated data.

3. The method of claim 1, wherein
objects loaded into said main memory by said object loading instructions include null object pointers for objects in persistent storage that are referenced by said objects loaded in said main memory;
said revising step includes revising said initial computer program so that said object loading instructions are invoked whenever a null object pointer in an object in said second set of object classes is accessed.

4. The method of claim 1 wherein the objects are rows in a database table.

5. A method of generating object-oriented computer programs for accessing and updating persistently stored objects, wherein the method is performed under program control by a computer, the method comprising the steps of:

receiving an initial computer program that includes original instructions for accessing objects stored in a computer's main memory;
scanning the initial computer program to automatically identify object accessing instructions and corresponding program locations at which additional instructions are to be added representing a first subset of identified program locations;
automatically, under computer program control, revising said initial computer program to generate a revised computer program by:
adding object loading instructions to the initial computer program at the first subset of the identified program locations, wherein the added object loading instructions, during execution of said revised computer program, load respective ones of said objects from persistent storage into said main memory when each said respective object is accessed for a first time;
wherein
said initial computer program is a bytecode program;
said objects accessed and updated by said original instructions include objects in a first set of object classes, and said objects stored in said persistent storage by said object storing instructions include objects in a second set of object classes that is a subset of said first set of object classes;
said original instructions include object data structure defining instructions for defining data structures associated with said objects in said first set of object classes;
said revising step further includes:
adding supplemental object definition instructions that revise said data structures associated with said second set of object classes so as to enable said objects in said second set of object classes to store both main memory object pointers and persistent storage object identifiers for objects referenced by said objects in said second set of object classes.

6. The method of claim 5, wherein
objects loaded into said main memory by said object loading instructions include null object pointers for objects in persistent storage that are referenced by said objects loaded in said main memory;
said revising step includes revising said initial computer program so that said object loading instructions are invoked whenever a null object pointer in an object in said second set of object classes is accessed.

7. The method of claim 5 wherein the objects are rows in a database table.

8. A computer program product for use in conjunction with a computer system, the computer program product comprising a computer readable storage medium and a computer program mechanism embedded therein, the computer program mechanism comprising:

a postprocessor procedure for modifying an initial computer program that includes original instructions for accessing objects stored in a computer's main memory;
said postprocessor procedure including instructions for:
scanning the initial computer program to automatically identify object accessing instructions and corresponding program locations at which additional instructions are to be added representing a first subset of identified program locations,
automatically, under the processor's control, revising said initial computer program to generate a revised computer program by adding supplemental instructions to said initial computer program, said supplemental instructions including:
object loading instructions, added to the initial computer program at the first subset of the identified program locations, wherein the added object loading instructions, during execution of said revised computer program, load respective ones of said objects from persistent storage into said main memory when each said respective object is accessed for a first time;
wherein
said initial computer program also includes original instructions for updating objects stored in said computer's main memory;
said postprocessor procedure also includes instructions for:
scanning said initial computer program to automatically identify object updating instructions and corresponding program locations at which additional instructions are to be added representing a second subset of identified program locations;
automatically revising said initial computer program to generate said revised computer program by adding supplemental instructions to said initial computer program, said supplemental instructions including:
object storing instructions, added to said initial computer program at the second subset of the identified program locations, wherein the added object storing instructions, during execution of said revised computer program, store respective ones of said objects in said computer's main memory into said persistent storage upon the occurrence of predefined events;
said objects accessed and updated by said original instructions include objects in a first set of object classes, and said objects stored in said persistent storage by said object storing instructions include objects in a second set of object classes that is a subset of said first set of object classes;
said original instructions include object data structure defining instructions for defining data structures associated with said objects in said first set of object classes;
said supplemental instructions further include:
supplemental object definition instructions that revise said data structures associated with said second set of object classes so as to enable said objects in said second set of object classes to store both main memory object pointers and persistent storage object identifiers for objects referenced by said objects in said second set of object classes.

9. The computer program product of claim 8, said supplemental instructions including:

dirty object marking instructions that, during execution of said revised computer program, store data indicating which objects in said computer's main memory contain new and/or updated data;

wherein said object storing instructions store in said persistent storage those of said objects in said computer's main memory that contain new and/or updated data.

10. The computer program product of claim 8, wherein objects loaded into said main memory by said object loading instructions include null object pointers for objects in persistent storage that are referenced by said objects loaded in said main memory;

said postprocessor procedure revises said initial computer program so that said object loading instructions are invoked whenever a null object pointer in an object in said second set of object classes is accessed.

11. The computer program product of claim 8 wherein the objects are rows in a database table.

12. A computer program product for use in conjunction with a computer system, the computer program product comprising a computer readable storage medium and a computer program mechanism embedded therein, the computer program mechanism comprising:

a postprocessor procedure for modifying an initial computer program that includes original instructions for accessing objects stored in a computer's main memory, said postprocessor procedure including instructions for:

scanning the initial computer program to automatically identify object accessing instructions and corresponding program locations at which additional instructions are to be added representing a first subset of identified program locations, automatically, under the processor's control, revising said initial computer program to generate a revised computer program by adding supplemental instructions to said initial computer program, said supplemental instructions including:

object loading instructions, added to the initial computer program at the first subset of the identified program locations, wherein the added object loading instructions, during execution of said revised computer program, load respective ones of said objects from persistent storage into said main memory when each said respective object is accessed for a first time;

wherein said initial computer program is a bytecode program;

said objects accessed and updated by said original instructions include objects in a first set of object classes, and said objects stored in said persistent storage by said object storing instructions include objects in a second set of object classes that is a subset of said first set of object classes;

said original instructions include object data structure defining instructions for defining data structures associated with said objects in said first set of object classes;

said supplemental instructions further include:

supplemental object definition instructions that revise said data structures associated with said second set of object classes so as to enable said objects in said second set of object classes to store both main memory object pointers and persistent storage object identifiers for objects referenced by said objects in said second set of object classes.

13. The computer program product of claim 12, wherein objects loaded into said main memory by said object loading instructions include null object pointers for objects in persistent storage that are referenced by said objects loaded in said main memory;

said postprocessor procedure revises said initial computer program so that said object loading instructions are invoked whenever a null object pointer in an object in said second set of object classes is accessed.

14. The computer program product of claim 12 wherein the objects are rows in a database table.

15. A computer system, comprising:

memory, including a main memory for storing objects;

said memory further storing an initial computer program, a revised computer program and a postprocessor procedure for modifying an initial computer program that includes original instructions for accessing objects stored in said main memory;

said postprocessor procedure including instructions for:

scanning said initial computer program to automatically identify object accessing instructions and corresponding program locations at which additional instructions are to be added representing a first subset of identified program locations;

automatically, under control of said postprocessor procedure, revising said initial computer program to generate a revised computer program by adding supplemental instructions to said initial computer program, said supplemental instructions including:

object loading instructions, added to the initial computer program at the first subset of the identified program locations, wherein the added object loading instructions, during execution of said revised computer program, load respective ones of said objects from persistent storage into said main memory when each said respective object is accessed for a first time;

wherein said initial computer program includes original instructions for updating objects stored in said main memory;

said postprocessor procedure also includes instructions for:

scanning said initial computer program to automatically identify object updating instructions and corresponding program locations at which additional instructions are to be added representing a second subset of identified program locations;

automatically, under control of said postprocessor procedure, revising said initial computer program to generate a revised computer program by adding supplemental instructions to said initial computer program, said supplemental instructions including:

object storing instructions, added to said initial computer program at the second subset of the identified program locations, wherein the added object storing instructions, during execution of said revised computer program, store respective ones of said objects in said computer's main memory into said persistent storage upon the occurrence of predefined events;

said objects accessed and updated by said original instructions include objects in a first set of object classes, and said objects stored in said persistent storage by said object storing instructions include objects in a second set of object classes that is a subset of said first set of object classes;

said original instructions include object data structure defining instructions for defining data structures associated with said objects in said first set of object classes; and said supplemental instructions further include:
supplemental object definition instructions that revise said data structures associated with said second set of object classes so as to enable said objects in said second set of object classes to store both main memory object pointers and persistent storage object identifiers for objects referenced by said objects in said second set of object classes.

16. The computer system of claim 15,
said supplemental instructions including:
dirty object marking instructions that, during execution of said revised computer program, store data indicating which objects in said computer's main memory contain new and/or updated data;
wherein said object storing instructions store in said persistent storage those of said objects in said computer's main memory that contain new and/or updated data.

17. The computer system of claim 15, wherein
objects loaded into said main memory by said object loading instructions include null object pointers for objects in persistent storage that are referenced by said objects loaded in said main memory;
said postprocessor procedure revises said initial computer program so that said object loading instructions are invoked whenever a null object pointer in an object in said second set of object classes is accessed.

18. The computer system of claim 15 wherein the objects are rows in a database table.

19. A computer system, comprising:
memory, including a main memory for storing objects;
said memory further storing an initial computer program, a revised computer program and a postprocessor procedure for modifying an initial computer program that includes original instructions for accessing objects stored in said main memory;
said postprocessor procedure including instructions for:
scanning said initial computer program to automatically identify object accessing instructions and corresponding program locations at which additional instructions are to be added representing a first subset of identified program locations;
automatically, under control of said postprocessor procedure, revising said initial computer program to generate a revised computer program by adding supplemental instructions to said initial computer program, said supplemental instructions including:
object loading instructions, added to the initial computer program at the first subset of the identified program locations, wherein the added object loading instructions, during execution of said revised computer program, load respective ones of said objects from persistent storage into said main memory when each said respective object is accessed for a first time;

wherein
said initial computer program is a bytecode program;
said objects accessed and updated by said original instructions include objects in a first set of object classes, and said objects stored in said persistent storage by said object storing instructions include objects in a second set of object classes that is a subset of said first set of object classes;
said original instructions include object data structure defining instructions for defining data structures associated with said objects in said first set of object classes; and
said supplemental instructions further include:
supplemental object definition instructions that revise said data structures associated with said second set of object classes so as to enable said objects in said second set of object classes to store both main memory object pointers and persistent storage object identifiers for objects referenced by said objects in said second set of object classes.

20. The computer system of claim 19, wherein
objects loaded into said main memory by said object loading instructions include null object pointers for objects in persistent storage that are referenced by said objects loaded in said main memory;
said postprocessor procedure revises said initial computer program so that said object loading instructions are invoked whenever a null object pointer in an object in said second set of object classes is accessed.

21. The computer system of claim 19 wherein the objects are rows in a database table.

* * * * *